(12) United States Patent
Li et al.

(10) Patent No.: US 9,363,049 B2
(45) Date of Patent: Jun. 7, 2016

(54) METHOD AND APPARATUS FOR SUPPORTING SYNCHRONOUS HARQ TRANSMISSION

(75) Inventors: Yingyang Li, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 197 days.

(21) Appl. No.: 13/453,582

(22) Filed: Apr. 23, 2012

(65) Prior Publication Data

US 2012/0269180 A1   Oct. 25, 2012

(30) Foreign Application Priority Data

Apr. 22, 2011   (CN) .......................... 2011 1 0111627

(51) Int. Cl.
*H04W 72/04* (2009.01)
*H04L 5/00* (2006.01)
*H04L 1/18* (2006.01)

(52) U.S. Cl.
CPC .............. *H04L 5/001* (2013.01); *H04L 1/1822* (2013.01); *H04L 1/1887* (2013.01); *H04L 1/1893* (2013.01); *H04L 5/0055* (2013.01)

(58) Field of Classification Search
USPC ......................................................... 370/336
See application file for complete search history.

(56) References Cited

U.S. PATENT DOCUMENTS

| 2010/0227569 | A1 | 9/2010 | Bala et al. |
| 2011/0080883 | A1 | 4/2011 | Prakash et al. |
| 2011/0261729 | A1 | 10/2011 | Ahn et al. |
| 2011/0310856 | A1 | 12/2011 | Hariharan et al. |
| 2011/0317645 | A1* | 12/2011 | Jen ................................. 370/329 |
| 2012/0224574 | A1* | 9/2012 | Hoymann et al. ............ 370/389 |
| 2013/0336267 | A1* | 12/2013 | Li et al. ......................... 370/329 |

FOREIGN PATENT DOCUMENTS

| CA | 2 829 747 | 9/2012 |
| EP | 2 690 815 | 1/2014 |
| JP | 2011-517168 | 5/2011 |
| JP | 2012-512582 | 5/2012 |

OTHER PUBLICATIONS

Nokia, Nokia Siemens Networks, "L1 Control Signaling with Carrier Aggregation in LTE-Advanced", 3GPP TSG-RAN WG1 Meeting #54bis, R1-083730, Sep. 29, 2008.
LG Electronics, "UL Control Channel Design to Support Carrier Aggregation", 3GPP TSG RAN WG1 #56bis, R1-091204, Mar. 23, 2009.
European Search Report dated Oct. 24, 2014 issued in counterpart application No. 12774162.7-1851.
Japanese Office Action dated Feb. 1, 2016 issued in counterpart application No. 2014-506319, 6 pages.

* cited by examiner

*Primary Examiner* — Donald Mills
*Assistant Examiner* — Henry Baron
(74) *Attorney, Agent, or Firm* — The Farrell Law Firm, P.C.

(57) ABSTRACT

A method and apparatus for supporting synchronous Hybrid Automatic Repeat reQuest (HARQ) transmission of Uplink are disclosed. When uplink/downlink configurations of multiple CA cellsrrier Aggregation (CA) are different, by configuring the HARQ transmission timing relations of primary cell and secondary cell, it is guaranteed that, with cross-carrier scheduling, the timing relation between a transmission of PUSCH in the Pcell and subsequent retransmission of PUSCH in the Scell is the same as that in Long Term Evolution (LTE) and LTE Advanced (LTE-A).

24 Claims, 7 Drawing Sheets

METHOD AND APPARATUS FOR SUPPORTING SYNCHRONOUS HARQ TRANSMISSION

PRIORITY

This application claims priority under 35 U.S.C. §119(a) to a Chinese Patent Application filed in the State Intellectual Property Office of the People's Republic of China on Apr. 22, 2011 and assigned Serial No. 201110111627.0, the contents of which are incorporated herein by reference.

BACKGROUND OF THE INVENTION

1. Field of the Invention

The present invention relates generally to a wireless communication system, and more particularly, to a method supporting synchronous Hybrid Automatic Repeat reQuest (HARQ) transmission of Uplink data.

2. Description of the Related Art

As an example of a wireless communication system, Long Term Evolution (LTE) technology supports both Frequency Division Duplexing (FDD) mode and Time Division Duplexing (TDD) mode.

FIG. 1 illustrates a frame structure of an LTE TDD system. Length of each radio frame 102 is 10 ms and the radio frame 102 is divided into two half-frames 104 of 5 ms, each of the half-frames 104 comprises 8 time slots 106 of 0.5 ms and 3 special fields 108 of 1 ms. The 3 special fields 108 are Downlink Pilot Time Slot (DwPTS), Guard Period (GP) and Uplink Pilot Time Slot (UpPTS) respectively, and each subframe is formed by two continuous time slots.

Transmission in a TDD system comprises transmission from the Base Station (BS) to User Equipment (UE), referred to as downlink, and transmission from UE to the BS, referred to as the uplink. Based on the frame structure shown in FIG. 1, uplink and downlink share 10 subframes within every 10 ms, and each subframe is configured either for uplink or for downlink. Subframes configured for uplink are referred to as uplink subframes and those configured for downlink are referred to as downlink subframes.

A TDD system supports seven types of uplink and downlink configurations, as shown in an example of the following Table 1, where D denotes a downlink subframe, U denotes an uplink subframe, and S denotes a special subframe comprising three special fields.

TABLE 1

| Indexes of UL/DL Configurations | Switch point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

An LTE TDD system supports the Hybrid Automatic Repeat reQuest (HARQ) mechanism, and under the basic principle the BS allocates uplink resources for UE; UE sends uplink data to the BS using the uplink resources, and the BS receives the uplink data and sends HARQ indication information to UE, which resends the uplink data according to this indication information. Specifically, the UE carries uplink data in a Physical Uplink Shared Channel (PUSCH), the BS carries a PUSCH scheduling and control information in a Physical Downlink Control Channel (PDCCH), and the BS carries HARQ indication information in a Physical HARQ Indicator Channel (PHICH). The foregoing procedure is based in a preconfigured timing relation to determine timing position of a transmission and timing position of subsequent retransmission of PUSCH, including timing relations from the PDCCH and the PHICH to the PUSCH and such relations from the PUSCH to the PHICH, which are referred to by a joint name as HARQ transmission timing.

In order to increase the user's transmission rate, LTE Advanced (LTE-A) is provided. In LTE-A, the technique of combining several Component Carriers (CC) to obtain wider operation bandwidth is referred to as Carrier Aggregation (CA). For example, a 100 MHz bandwidth can be supported by combining 5 20 MHz component carriers. Each CC is referred to as a cell. The BS can configure a UE to operate in multiple cells, wherein one cell is referred to as a Primary cell (Pcell), while other cells are referred to as Secondary cells (Scell).

In an LTE-A TDD system, it is limited that multiple combined cells adopt the same uplink/downlink configurations, so that HARQ transmission timing relation configured for one cell in LTE can be multiplexed completely without extra standardization operate. HARQ transmission timing relation in a prior system like as LTE and LTE-A will be described below.

First, the timing relation from the PDCCH and the PHICH to the PUSCH will be introduced.

As to the timing relation from the PDCCH to the PUSCH, assuming that the UE receives the PDCCH in downlink subframe n, this PDCCH controls the PUSCH in uplink subframe n+k. Value of k is defined in Table 2 below.

Specifically, as to uplink/downlink configurations 1-6, the number of uplink subframes is smaller than that of downlink subframes, and a unique HARQ transmission timing can be configured, corresponding to Table 2 below. A downlink subframe may not schedule a PUSCH, or only schedule a PUSCH in one uplink subframe. As to uplink/downlink configuration 0, the number of uplink subframes is greater than that of downlink subframes, and the PDCCH in each downlink subframe needs to schedule a PUSCH in two uplink subframes. Therefore, an uplink index (UL index) technique is used in the PDCCH to support scheduling the PUSCH in two uplink subframes. For example, when a UE receives the PDCCH in downlink subframe 0, PUSCH in uplink subframe 4 and/or that in uplink subframe 7 are/is scheduled; when the UE receives the PDCCH in the downlink subframe 1, the PUSCH in the uplink subframe 7 and/or that in uplink subframe 8 are/is scheduled.

TABLE 2

| TDD UL/DL Configuration | Downlink subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | | | | 4, 7 | 6, 7 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

As to the timing relation from the PHICH to the PUSCH, in LTE and LTE-A, PUSCH in each uplink subframe is allocated with a PHICH resource set separately. Assuming that the UE receives the PHICH in downlink subframe n, this PHICH controls the PUSCH in uplink subframe n+k. Value of k is defined as in an example of the following Table 3. Specifically, as to uplink/downlink configurations 1-6, the number of uplink subframes is smaller than that of downlink subframes, and a unique HARQ transmission timing can be configured. In Table 3 below, a downlink subframe may not be configured with a PHICH resource set, or may be configured with a PHICH resource set for only one uplink subframe. As to uplink/downlink configuration 0, the number of uplink subframes is greater than that of downlink subframes, two PHICH resource sets are configured in downlink subframe 0 and 5 respectively. For example, when the UE receives PHICH in downlink subframe 0, PUSCH in uplink subframe 4 and/or uplink subframe 7 may be triggered.

TABLE 3

| TDD UL/DL Configuration | Downlink subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 7 | | | | 4, 7 | 7 | | | |
| 1 | | 6 | | | 4 | | | 6 | | 4 |
| 2 | | | | 4 | | | | | 4 | 4 |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Second, the timing relation from PUSCH to PHICH in LTE and LTE-A will be introduced.

As to uplink/downlink configuration 1-6, when the UE receives the PHICH in downlink subframe i, this PHICH indicates an ACK/NACK of the PUSCH in uplink subframe i-k, and value of k is as shown in an example of following Table 4.

As to uplink/downlink configuration 0, when the UE receives the PHICH in the $0^{th}$ PHICH resource in downlink subframe i, this PHICH controls the PUSCH in uplink subframe i-k. When the UE receives the PHICH in the $1^{st}$ PHICH resource in downlink subframe 0 or in downlink subframe 5, this PHICH controls PUSCH transmission in uplink subframe i-6.

TABLE 4

| Uplink/downlink configuration | Downlink subframe index n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | | 4 | | 6 |
| 2 | | | 6 | | | | | 6 | | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

Two types of scheduling strategies are defined in LTE-A. The first type is cross-carrier scheduling, and the second type is non cross-carrier scheduling. In cross-carrier scheduling, data transmission in a cell is scheduled by the PDCCH sent by another cell, and in non cross-carrier scheduling, data transmission in a cell is scheduled by the PDCCH sent by the same cell.

When uplink/downlink configurations of multiple cells are the same, cross-carrier scheduling can fully reuse the HARQ transmission timing of non cross-carrier scheduling.

FIG. 2 illustrates conventional cross-carrier scheduling and non cross-carrier scheduling. As shown in FIG. 2, both cell1 and cell2 adopt uplink/downlink configuration 1, the number in the uplink subframe denotes a synchronous HARQ process number, the number in downlink subframe denotes a synchronous HARQ process number of the uplink subframe scheduled by this downlink subframe, the field filled with slashes is a downlink subframe, the field filled with a blank and solid is uplink subframes. As to non cross-carrier scheduling, the UE operates at cell2, the BS sends the PDCCH in the downlink subframe 211 to schedule the PUSCH in uplink subframe 201, and then sends the PHICH in downlink subframe 212, triggers UE to resend the PUSCH of uplink subframe 201 in uplink subframe 202. As to cross-carrier scheduling, the BS may send the PDCCH in downlink subframe 311, and may send the PHICH in downlink subframe 312.

Therefore, regardless of cross-carrier scheduling or non cross-carrier scheduling, the timing relation between the timing position of a transmission of the PUSCH and timing position of subsequent retransmission is constant, which is referred to herein as synchronous HARQ transmission.

When frequency domain distances among multiple cells that implement CA are long enough, these cells may adopt different uplink/downlink configurations without interfering with one another. Thus, in subsequent research of LTE-A, one project aims to research how to support HARQ transmission when uplink/downlink configurations of multiple cells are not identical. However, the prior art provides no solution for this problem.

SUMMARY OF THE INVENTION

The present invention provides a method and apparatus for supporting synchronous HARQ transmission of a PUSCH when uplink/downlink configurations adopted by multiple CA cells are not identical.

The method for supporting HARQ transmission of a PUSCH, when multiple CA cells adopt different uplink/downlink configurations, includes configuring an UE to operate in CA mode in which multiple CA cells adopt different uplink/downlink configurations, sending, by a BS, the PDCCH and/or the PHICH in a primary CA cell according to timing relations from the PDCCH and the PHICH to the PUSCH, and receiving, by the BS, the PUSCH sent by the UE in a secondary CA cell, sending the PHICH in the primary cell according to timing relations from the PUSCH to the PHICH after receiving the PUSCH, and receiving the PUSCH that is retransmitted by the UE in the secondary cell according to timing relation from the PHICH to the PUSCH.

According to the present invention, a method for performing synchronous HARQ transmission of Uplink data includes configuring a UE to operate in CA mode in which multiple CA cells adopt different uplink/downlink configurations, receiving, by the UE, a PDCCH and/or a PHICH sent from a BSBS in a primary CA cell according to timing relations from the PDCCH and the PHICH to the PUSCH, and sending, by the UE, the PUSCH in a secondary CA cell, receiving the PHICH in the primary cell according to timing relations from PUSCH to PHICH after sending the PUSCH, and resending the PUSCH in the secondary cell according to a timing relation from the PHICH to the PUSCH.

According to the present invention, an apparatus in a BSBS for supporting synchronous HARQ transmission of Uplink data includes a controller being adapted for configuring a UE to operate in CA mode in which multiple CA cells adopt different uplink/downlink configurations, and determining timing relations from a PDCCH and a PHICH to a PUSCH, timing relations from the PUSCH to the PHICH, and a timing relation from the PHICH to the PUSCH, a transmitting unit being adapted for sending a PDCCH and/or a PHICH in a primary CA cell according to the timing relations from the PDCCH and the PHICH to the PUSCH and sending the PHICH in the primary cell according to the timing relations from the PUSCH to the PHICH; and a reception unit being adapted for receiving the PUSCH sent by the UE in a secondary CA cell according to the timing relations from the PDCCH and the PHICH to the PUSCH and receiving the PUSCH that is retransmitted by the UE in the secondary cell according to the timing relation from the PHICH to the PUSCH.

According to the present invention, an apparatus in a UE for performing synchronous HARQ transmission of Uplink data includes a controller being adapted for configuring a UE to operate in a CA mode in which multiple CA cells adopt different uplink/downlink configurations and determining timing relations from a PDCCH and a PHICH to a PUSCH, timing relations from the PUSCH to the PHICH, and timing relation from the PHICH to the PUSCH, a receiving unit being adapted for receiving a PDCCH and/or the PHICH sent from a BSBS in a primary CA cell according to the timing relations from the PDCCH and the PHICH to the PUSCH, and receiving the PHICH in the primary cell according to the timing relations from the PUSCH to the PHICH, a transmission unit being adapted for sending the PUSCH in a secondary CA cell according to the timing relations from the PDCCH and the PHICH to the PUSCH, and resending the PUSCH in the secondary cell according to the timing relation from the PHICH to the PUSCH.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Hereinafter, embodiments of the present invention are described with reference to the accompanying drawings. In the following description, a detailed description of known functions and configurations incorporated herein may be omitted when such a description may obscure the subject matter of the present invention.

The present invention relates to the situation when uplink/downlink configurations of multiple CA cells are different. Similar to LTE and LTE-A, the BS configures the UE to operate at one or multiple cells (part or all of).

As to non cross-carrier scheduling, because the PUSCH in the uplink subframe of a cell is scheduled by the PDCCH and the PHICH in the downlink subframe of this cell, this cell may implement synchronous HARQ transmission of the PUSCH according to the timing relation from the PDCCH and the PHICH to the PUSCH and the timing relation from the PUSCH to the PHICH that are configured in a cell having the same uplink and downlink configurations in LTE and LTE-A.

As to cross-carrier scheduling, the cell sending the PDCCH and the PHICH is referred to as a primary cell, which is usually denoted as Pcell, and the cell sending PUSCH is referred to as a secondary cell, which is usually denoted as Scell. When uplink/downlink configuration of a Pcell is the same as that of a Scell, the synchronous HARQ transmission of the PUSCH may be implemented according to the timing relation from the PDCCH and the PHICH to the PUSCH and the timing relation from the PUSCH to the PHICH that are configured in a cell having the same uplink and downlink configurations in LTE and LTE-A. However, when uplink/downlink configuration of a Pcell is different from that of a Scell, the synchronous HARQ transmission of the PUSCH may not be implemented according to the configuration in LTE or LTE-A.

Figure 1:
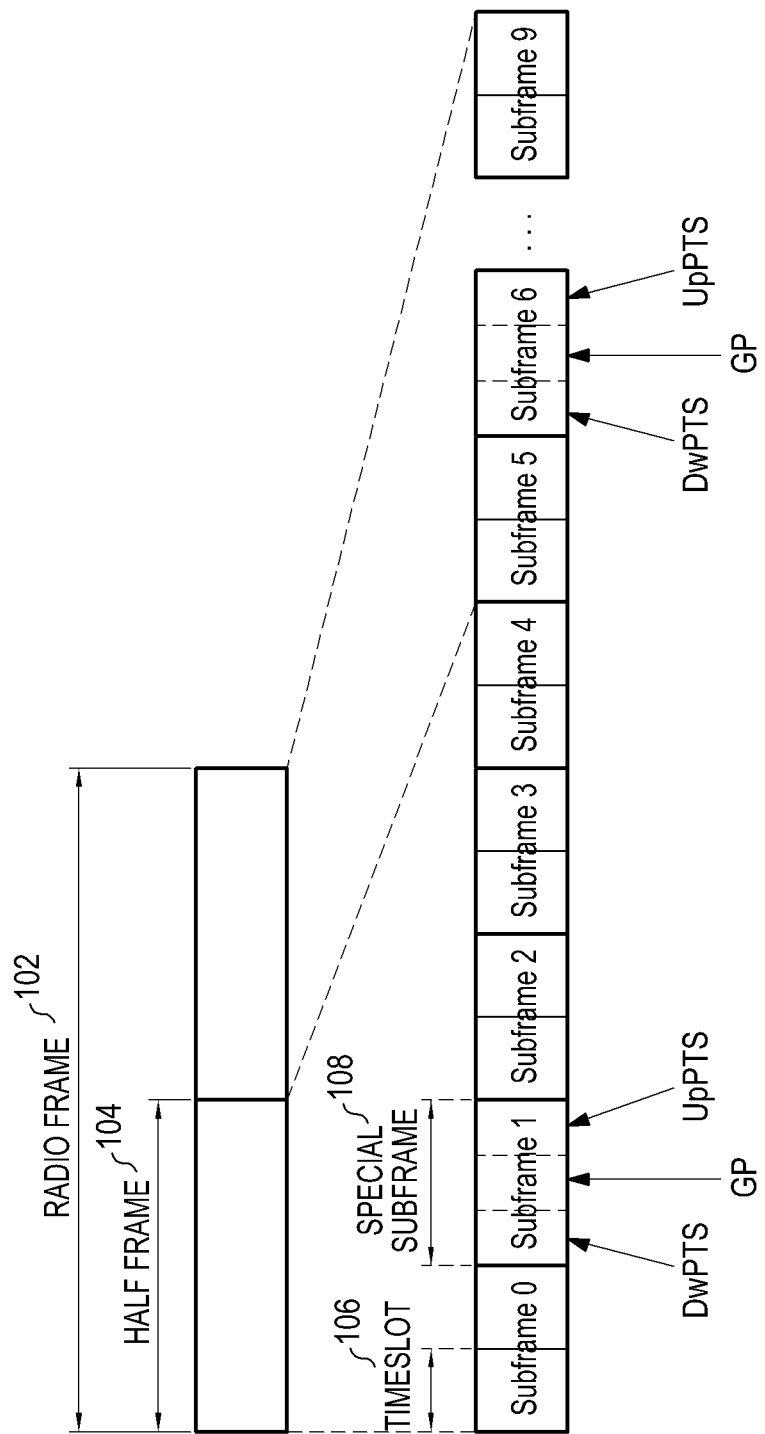
FIG. 1 illustrates a frame structure of a conventional LTE TDD system.
Figure 2:
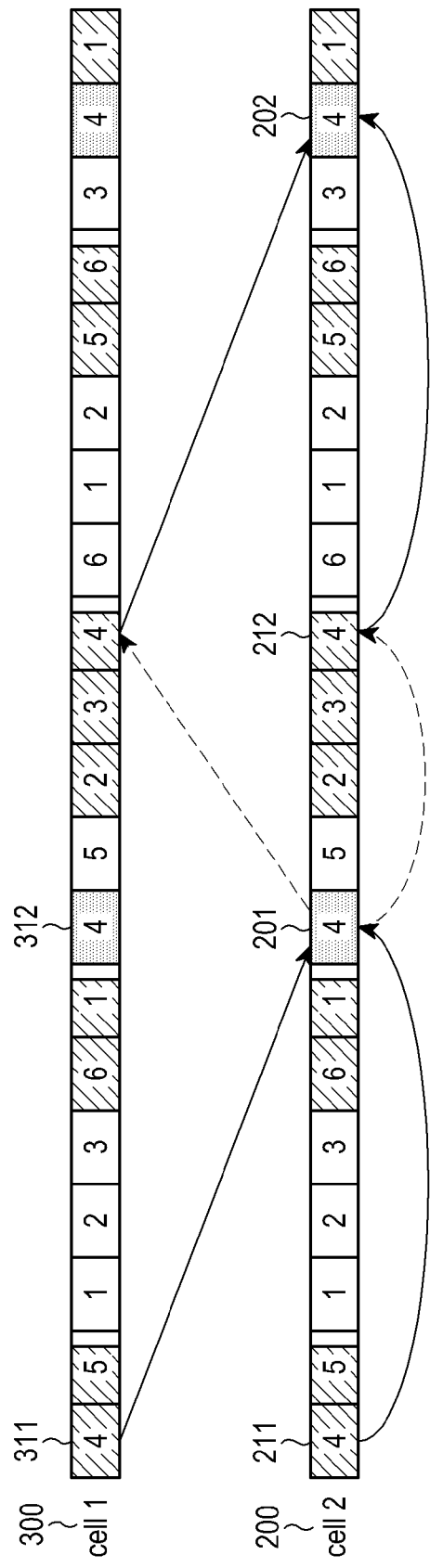
FIG. 2 illustrates conventional cross-carrier scheduling and non cross-carrier scheduling.
Figure 3:
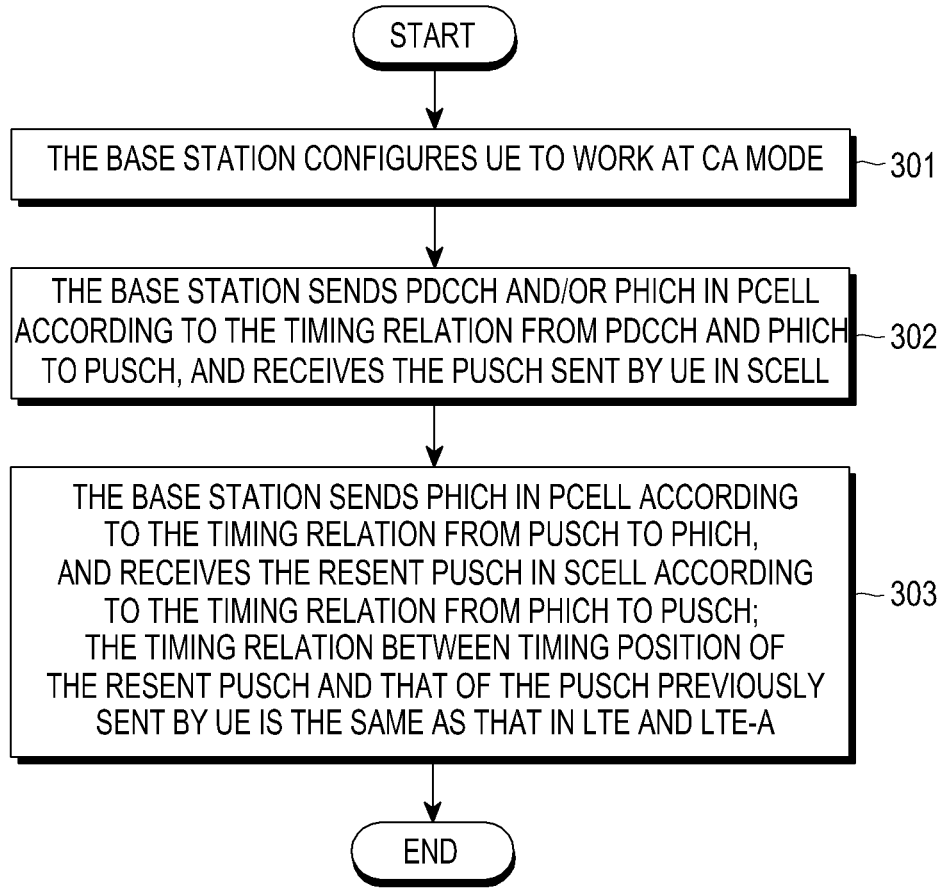
FIG. 3 illustrates a method supporting synchronous HARQ transmission of PUSCH according to the present invention.

When cross-carrier scheduling is implemented and the Pcell and Scell adopt different uplink/downlink configurations, FIG. 3 illustrates a method supporting synchronous HARQ transmission of PUSCH, according to the present invention.

In step 301, the BS configures the UE to operate in CA mode. In step 302, the BS sends the PDCCH and/or the PHICH in the Pcell according to the timing relation from the PDCCH and the PHICH to the PUSCH, and receives the PUSCH sent by UE in Scell. In step 303: the BS sends the PHICH in the Pcell according to the timing relation from the PUSCH to the PHICH, and receives the retransmitted PUSCH in the Scell according to the timing relation from the PHICH to the PUSCH; the timing relation between timing position of the retransmission PUSCH and that of the PUSCH previously sent by the UE is the same as that in LTE and LTE-A.

Accordingly, the method of the present invention guarantees that the timing relation between timing position of the PUSCH sent in the Scell by the UE for one time and that of the next PUSCH retransmission by UE is the same as that in LTE and LTE-A.

Further, compared to a UE in LTE and LTE-A, a UE according to the present invention is referred to as a new UE if only uplink resource of a new UE and that of an LTE/LTE-A UE are orthogonal for one transmission, uplink resource of the new UE and that of the LTE/LTE-A UE remain orthogonal for subsequent PUSCH retransmission. Thus, unlimited synchronous HARQ transmission is provided, and flexibility of the scheduler is enhanced.

Figure 4:
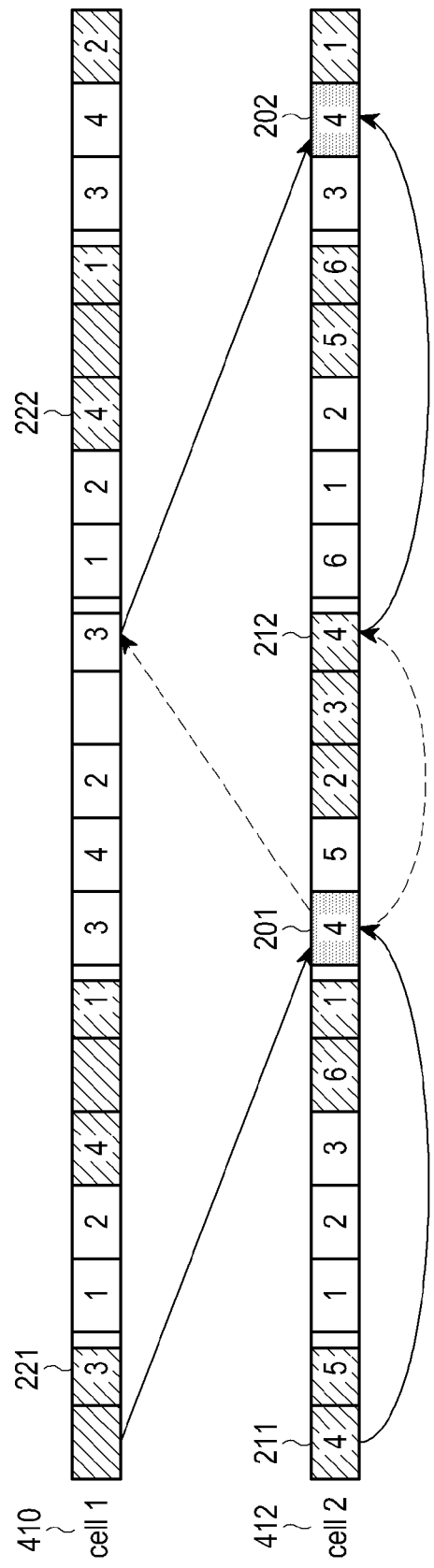
FIG. 4 illustrates synchronous HARQ transmission according to the present invention.

FIG. 4 illustrates synchronous HARQ transmission according to the present invention. In FIG. 4, the field filled with slashes is downlink subframe, while the field filled with blank and solid is uplink subframe, assuming that the first cell 410, i.e., cell 1 adopts uplink/downlink configuration 1 and the second cell 412, i.e., cell 2 adopts uplink/downlink configuration 0, the numeral in the uplink subframe denotes the synchronous HARQ process number, the numeral in the downlink subframe denotes the synchronous HARQ process number of the uplink subframe scheduled by this downlink subframe.

Conventionally, as to an LTE UE operating at the second cell 412, the BS sends the PDCCH in downlink subframe 211 to schedule PUSCH in uplink subframe 201, and then sends PHICH information in downlink subframe 212 and triggers synchronous HARQ retransmission of the PUSCH of uplink subframe 201 in uplink subframe 202.

According to the present invention, as to a new UE configured to operate at two cells 410, 412 simultaneously, assuming that the BS cross-carrier schedules the second cell 412 via the first cell 410, in order to implement synchronous HARQ transmission, according to the present invention, it is guaranteed that the PUSCH in uplink subframe 201 still performs synchronous HARQ retransmission in uplink subframe 202, but the PDCCH scheduling the PUSCH in uplink subframe 201 may be sent in downlink subframe 221 of the first cell 410, and the PHICH information in allusion to the PUSCH in uplink subframe 201 is sent in downlink subframe 222 of the first cell 410.

According to the present invention, the process of preconfiguring the timing relation from the PDCCH and the PHICH to the PUSCH and that from the PUSCH to the PHICH corresponding to the uplink subframe of the Scell may be implemented based on the following.

In step 1, according to the configuration principle, configuring the timing relation from the PDCCH and the PHICH corresponding to the uplink subframe of the Scell to the PUSCH.

The foregoing configuration principle includes the following:

Principle 1: the index of downlink subframe n of the Pcell scheduling uplink subframe of the Scell is greater than or equal to n+k, where k is a constant such as 4, thereby ensuring that a minimum duration of the UE processing time is (k−1) ms.

Principle 2: ensuring that numbers of uplink subframes scheduled by downlink subframes of the Pcell equal to each other or as close as possible.

Principle 3: ensuring the timing position of the PDCCH and the PHICH that schedule the PUSCH to be not later than the timing position of the PDCCH and the PHICH that schedule the PUSCH last.

Principle 4: ensuring that the PDCCH and the PHICH that schedule the PUSCH of the same uplink subframe are located at the same timing position. When the PDCCH of multiple downlink subframes schedules the PUSCH of the same uplink subframe, timing position of the PHICH is the same as that of one of the PDCCHs.

In step 2, according to the timing position from the PDCCH and the PHICH corresponding to the uplink subframe of the Scell to the PUSCH, the timing relation from the PUSCH to the PHICH are predicted.

For example, as to the PUSCH sent in uplink subframe n, according to the timing relation from the PUSCH to the PHICH in LTE and LTE-A shown in Table 4, it is determined that the PHICH is sent in downlink subframe n+p, and according to the timing relation from the PDCCH and the PHICH to the PUSCH shown in Tables 2 and 3, it is determined that the retransmission PUSCH is resent in uplink subframe n+p+r. Therefore, as to the situation of cross-carrier scheduling when multiple CA cells adopt different uplink/downlink configurations, a new timing relation from the PDCCH and the PHICH to the PUSCH is configured, in which new timing relation index of the PHICH downlink subframe that schedules the retransmission of PUSCH uplink subframe n+p+r is in (n+p+r)−g. In other words, the timing position from the PUSCH to the PHICH corresponding to uplink subframe n sending PUSCH is n+(p+r−g).

When creating the specification regarding uplink synchronous HARQ, the timing relation from the PUSCH to the PHICH is provided in the form of Tables only, or it is described in text meanwhile that the timing relation between a transmission of the PUSCH in Pcell and subsequent retransmission of the PUSCH in the Scell is the same as that of the cell with the same uplink/downlink configuration in LTE and LTE-A, so that the timing relation from PHICH to the PUSCH can be determined; or both the timing relation from the PUSCH to the PHICH and the timing relation from the PDCCH and the PHICH to the PUSCH may be provided in the form of Tables, the two Tables function together to allow the timing relation between a transmission of the PUSCH and subsequent retransmission of the PUSCH in the Scell be the same as that of the cell with the same uplink/downlink configuration in LTE and LTE-A.

Embodiment 1

As to the situation of cross-carrier scheduling, reuse the configured timing relation from the PDCCH and the PHICH to the PUSCH in LTE and LTE-A as much as possible.

Specifically, as to an uplink subframe of an Scell, if it is also an uplink subframe at the same timing position of a Pcell, the timing relation from the PDCCH and the PHICH to the PUSCH corresponding to this uplink subframe of the Scell is the same as the timing relation from the PDCCH and the PHICH to the PUSCH corresponding to the uplink subframe of the Pcell at this same timing position.

Figure 5:
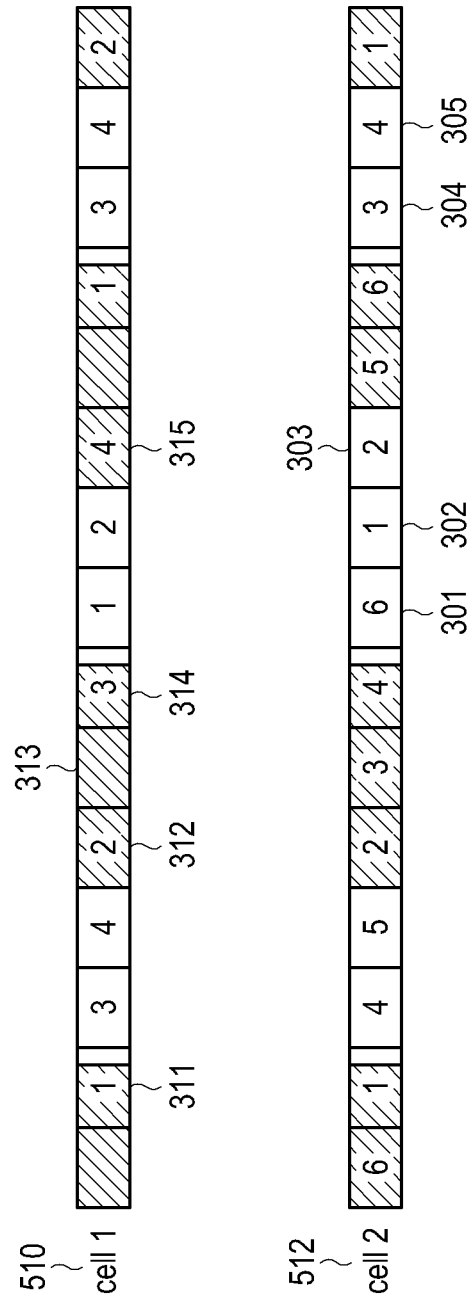
FIG. 5 illustrates cross-carrier scheduling according to the present invention.

FIG. 5 illustrates HARQ transmission timing of cross-carrier scheduling according to the present invention. As shown in FIG. 5, the field including slashes is a downlink subframe, the field marked blank is an uplink subframe, cell 1 510 is the primary cell, cell 2 512 is the secondary cell, uplink subframes 301, 302, 304 and 305 of cell 2 512 are also uplink subframes at the same timing positions of cell 1 510, so the timing relation from the PDCCH and the PHICH to the PUSCH of uplink subframes 301, 302, 304 and 305 of cell 2 512 is the same as the timing relation from the PDCCH and the PHICH to the PUSCH configured for a cell with the same uplink/downlink configuration as cell 1 510 in LTE and LTE-A, namely the PDCCH and the PHICH can be sent in the downlink subframe 311, 312, 314 and 315 of cell respectively.

As to an uplink subframe of an Scell, if it is an downlink subframe at the same timing position of a Pcell, the timing relation from the PDCCH and the PHICH to the PUSCH corresponding to this uplink subframe of the Scell cannot reuse the configuration result in LTE and LTE-A, but should be reconfigured according to the method of embodiment 1. With reference to FIG. 5, as to uplink subframe 303 in cell 2 512, since it is a downlink subframe at the same timing position of cell 1 510, the timing relation from the PDCCH and the PHICH to the PUSCH corresponding to uplink subframe 303 of cell 2 512 has to be reconfigured, for example, the PDCCH and the PHICH can be sent in downlink subframe 313 of cell 1 510.

In this embodiment 1, the following two methods can be adopted to configure the timing relations from the PDCCH and the PHICH to the PUSCH.

First, according to various combinations of different uplink/downlink configurations adopted by the Pcell and the Scell, the timing relations from the PDCCH and the PHICH to the PUSCH corresponding to uplink subframes of Scell can be configured respectively. Because LTE and LTE-A supports seven types of TDD uplink/downlink configurations, as to each type of uplink/downlink configuration, assuming that the configuration is used for the Pcell, the timing relation from the PDCCH and the PHICH to the PUSCH for the other 6 types of uplink/downlink configurations have to be configured correspondingly, which means that at most forty-two (42) types of timing relations have to be configured.

1) Assuming that frame edges of cells are aligned:

When Pcell adopts uplink/downlink configuration 1, 2, 4 or 5, the timing relation from PDCCH and PHICH to PUSCH can be uniquely determined according to the above mentioned principle 1 to principle 4. Examples of the following Table 5, Table 6, Table 7, and Table 8 respectively shows the timing relation from The PDCCH and the PHICH to the PUSCH corresponding to uplink subframe of the Scell when the Pcell adopts uplink/downlink configuration 1, 2 4 or 5, the timing relation from the PUSCH to the PHICH can be obtained according to the method introduced above, which will not be described here.

TABLE 5

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | 4 | 4 | 6 | — | — | 4 |
| 1 | — | 6 | — | — | 4 | — | 6 | — | — | 4 |
| 2 | — | 6 | — | — | — | — | 6 | — | — | — |
| 3 | 4 | — | — | — | — | — | 6 | — | — | 4 |
| 4 | — | — | — | — | — | — | 6 | — | — | 4 |
| 5 | — | — | — | — | — | — | 6 | — | — | — |
| 6 | 4 | 6 | — | — | 4 | — | 6 | — | — | 4 |

TABLE 6

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4 | — | — | 4 | 4 | 4 | — | — | 4 | 4 |
| 1 | — | — | — | 4 | 4 | — | — | — | 4 | 4 |
| 2 | — | — | 4 | — | — | — | — | — | 4 | — |
| 3 | 4 | — | — | — | — | — | — | — | 4 | 4 |
| 4 | — | — | — | — | — | — | — | — | 4 | 4 |
| 5 | — | — | — | — | — | — | — | — | 4 | — |
| 6 | 4 | — | — | 4 | 4 | — | — | — | 4 | 4 |

TABLE 7

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | 4 | 4 | — | — | 4 | 4 |
| 1 | — | 6 | — | — | 4 | — | — | — | 4 | 4 |
| 2 | — | 6 | — | — | — | — | — | — | 4 | — |
| 3 | 4 | — | — | — | — | — | — | — | 4 | 4 |
| 4 | — | — | — | — | — | — | — | — | 4 | 4 |
| 5 | — | — | — | — | — | — | — | — | 4 | — |
| 6 | 4 | 6 | — | — | 4 | — | — | — | 4 | 4 |

TABLE 8

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4 | — | — | 4 | 4 | 4 | — | — | 4 | 4 |
| 1 | — | — | — | 4 | 4 | — | — | — | 4 | 4 |

TABLE 8-continued

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 2 | — | — | — | 4 | — | — | — | — | 4 | — |
| 3 | 4 | — | — | — | — | — | — | — | 4 | 4 |
| 4 | — | — | — | — | — | — | — | — | 4 | 4 |
| 5 | — | — | — | — | — | — | — | — | 4 | — |
| 6 | 4 | — | — | 4 | 4 | — | — | — | 4 | 4 |

When Pcell adopts uplink/downlink configuration 0, because the number of uplink subframes is the greatest in uplink/downlink configuration 0, uplink subframes in other uplink/downlink configurations are subset of the uplink subframes in uplink/downlink configuration 0. Under such situation, the timing relations from the PDCCH and the PHICH to the PUSCH corresponding to uplink subframes of Scell can be obtained by directly reuse a subset of the timing relations from the PDCCH and the PHICH to the PUSCH configured for a cell adopting uplink/downlink configuration 0 in LTE and LTE-A.

Timing relations from the PDCCH to the PUSCH and that from the PHICH to the PUSCH corresponding to uplink subframes of the Scell when the Pcell adopts uplink/downlink configuration 0 will be introduced respectively hereinafter.

The timing relation from the PDCCH to the PUSCH is introduced first.

According to the timing relation from the PDCCH to the PUSCH configured for a cell adopting uplink/downlink configuration 0 in LTE and LTE-A, as to each downlink subframe of the Pcell, if it is also an uplink subframe at the same timing position of the Scell as the timing position of the uplink subframe scheduled by this downlink subframe, the timing position from this downlink subframe to this uplink subframe is maintained, and the timing position from this downlink subframe to this uplink subframe is otherwise deleted.

As shown in an example of following Table 9, taking the example of the Pcell adopting uplink/downlink configuration 0 and the Scell adopting uplink/downlink configuration 1, subframes with index 4 and index 9 in the Scell are both downlinks subframes, when uplink/downlink configuration 0 is adopted in Table 2, downlink subframe 1 and downlink subframe 5 of a cell can schedule uplink subframe 4 and uplink subframe 9 respectively, according to the above analysis, subframe 4 and subframe 9 in the Scell are both downlink subframes, so this timing relation shown in Table 2 can be deleted, namely when uplink/downlink configuration 0 is adopted in Table 2, the value of k being 4 under downlink subframe 0 and the value of k being 4 under downlink subframe 5 can be deleted, so as to obtain the values of k when uplink/downlink configuration 1 is adopted in Table 9.

TABLE 9

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | — | — | — | 4, 7 | 6, 7 | — | — | — |
| 1 | 7 | 6, 7 | — | — | — | 7 | 6, 7 | — | — | — |
| 2 | 7 | 6 | — | — | — | 7 | 6 | — | — | — |
| 3 | 4 | — | — | — | — | 7 | 6, 7 | — | — | — |
| 4 | — | — | — | — | — | 7 | 6, 7 | — | — | — |
| 5 | — | — | — | — | — | 7 | 6 | — | — | — |
| 6 | 4, 7 | 6, 7 | — | — | — | 7 | 6, 7 | — | — | — |

When the Pcell adopts uplink/downlink configuration 0 while the Scell adopts a different uplink/downlink configuration, it may occur that a downlink subframe of the Pcell needs to schedule the PUSCH in one uplink subframe. In this case, the uplink index technique in LTE and LTE-A can still be used, but an uplink index needs to be set with a proper value to indicate the scheduling of the PUSCH of uplink subframes that practically exist for the Scell, or if the uplink index in the downlink subframe of the Pcell may be unused, this field may be reserved or explained as an uplink allocation index (UAI) for feeding back PDSCH ACK/NACK information transmission on the PUSCH.

In order to avoid using uplink index in the downlink subframe of the Pcell as much as possible, Table 9 may be further optimized.

The optimization result aiming at uplink/downlink configurations 1-5 is shown in an example of following Table 10. The optimizing method includes, if there is a certain uplink subframe that can be scheduled in multiple downlink subframes, the optimizing method can allow this uplink subframe to be scheduled only by one downlink subframe, such as in uplink/downlink configuration 1 shown in Table 9, both downlink subframe 0 and downlink subframe 1 schedule uplink subframe 7, so the timing relation of downlink subframe 1 scheduling uplink subframe 7 can be deleted, so that downlink subframe 1 schedules one uplink subframe only. As to those uplink subframes already scheduled only by one downlink subframe in Table 9, the timing relation with the smallest scheduling delay may be maintained, such as in uplink/downlink configuration 2 shown in Table 9, where both downlink subframe 0 and downlink subframe 1 schedule uplink subframe 7. Scheduling delay of the timing relation from downlink subframe 0 to uplink subframe 7 is longer, and this timing relation can be deleted and only the timing relation from downlink subframe 1 to uplink subframe 7 is maintained.

TABLE 10

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | — | — | — | 4, 7 | 6, 7 | — | — | — |
| 1 | 7 | 7 | — | — | — | 7 | 7 | — | — | — |
| 2 | — | 6 | — | — | — | — | 6 | — | — | — |
| 3 | 4 | — | — | — | — | 7 | 7 | — | — | — |
| 4 | — | — | — | — | — | 7 | 7 | — | — | — |
| 5 | — | — | — | — | — | — | 6 | — | — | — |
| 6 | 4, 7 | 6, 7 | — | — | — | 7 | 6, 7 | — | — | — |

The optimization result aiming at uplink/downlink configurations 6 is shown in an example of following Table 11, the optimizing method comprises mainly: reuse uplink indexes of uplink/downlink configuration 0 in LTE and LTE-A so that downlink subframe 0 and downlink subframe 1 schedule three uplink subframes altogether; but it can be implemented in downlink subframe 5 and downlink subframe 6 that one downlink subframe schedules PUSCH in one uplink subframe only, such as in downlink configuration 6 shown in Table 9, both downlink subframe 5 and downlink subframe 6 may schedule uplink subframe 2, so the timing relation of downlink subframe 6 scheduling uplink subframe 2 can be deleted, so that downlink subframe 6 schedules one uplink subframe only.

TABLE 11

| UL/DL configurations of Scell | Subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | — | — | — | 4, 7 | 6, 7 | — | — | — |
| 1 | 7 | 7 | — | — | — | 7 | 7 | — | — | — |
| 2 | — | 6 | — | — | — | — | 6 | — | — | — |
| 3 | 4 | — | — | — | — | 7 | 7 | — | — | — |
| 4 | — | — | — | — | — | 7 | 7 | — | — | — |
| 5 | — | — | — | — | — | — | 6 | — | — | — |
| 6 | 4, 7 | 6, 7 | — | — | — | 7 | 7 | — | — | — |

Then, the timing relation from the PHICH to the PUSCH is introduced.

According to provisions of LTE and LTE-A, when Pcell adopts uplink/downlink configuration 0, the downlink subframe 0 and downlink subframe 5 are configured with two PHICH resource sets respectively, and downlink subframe 1 and downlink subframe 6 are configured with one PHICH resource set respectively. When the Scell adopts various uplink/downlink configurations, according to number of practical uplink subframes of the Scell, part of the above mentioned PHICH resource sets are used for PHICH transmission, and PHICH information corresponding to the PUSCH in an uplink subframe of each Scell is transmission in one PHICH resource set only.

Corresponding to Table 9, as shown in an example of following Table 12, according to the timing relation from the PHICH to the PUSCH configured for a cell using uplink/downlink configuration 0 in LTE and LTE-A, as to each downlink subframe of the Pcell, if it is also an uplink subframe at the same timing position in the Scell as the timing position of the uplink subframe scheduled by this downlink subframe, the timing relation from this downlink subframe to this uplink subframe is maintained.

TABLE 12

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 7 | — | — | — | 4, 7 | 7 | — | — | — |
| 1 | 7 | 7 | — | — | — | 7 | 7 | — | — | — |
| 2 | 7 | — | — | — | — | 7 | — | — | — | — |
| 3 | 4 | — | — | — | — | 7 | 7 | — | — | — |
| 4 | — | — | — | — | — | 7 | 7 | — | — | — |
| 5 | — | — | — | — | — | 7 | — | — | — | — |
| 6 | 4, 7 | 7 | — | — | — | 7 | 7 | — | — | — |

Similarly, corresponding to Table 10 and Table 11, the timing relations from the PHICH to the PUSCH corresponding to uplink subframes of the Scell are as shown in an example of following Table 13.

TABLE 13

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 7 | — | — | — | 4, 7 | 7 | — | — | — |
| 1 | 7 | 7 | — | — | — | 7 | 7 | — | — | — |
| 2 | — | 6 | — | — | — | — | 6 | — | — | — |
| 3 | 4 | — | — | — | — | 7 | 7 | — | — | — |

TABLE 13-continued

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 4 | — | — | — | — | — | 7 | 7 | — | — | — |
| 5 | — | — | — | — | — | — | 6 | — | — | — |
| 6 | 4, 7 | 7 | — | — | — | 7 | 7 | — | — | — |

It is noted that in Tables 9-13, processing time of the BS's receiving the PUSCH is reduced in certain cases. Specifically, when the Scell adopts uplink/downlink configuration 1, 3 or 4, the above cases may occur.

Figure 6:
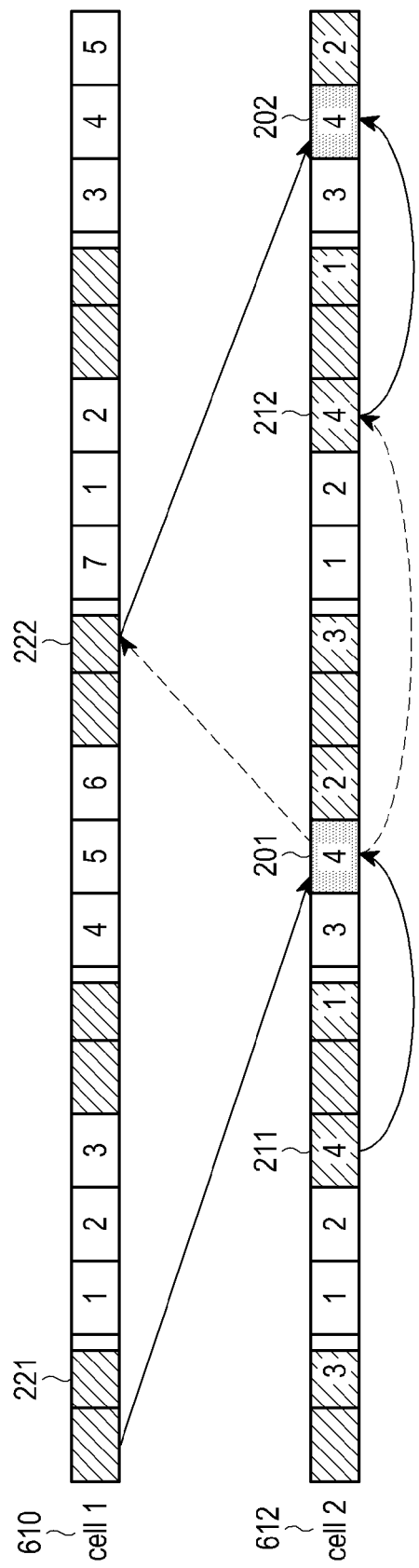
FIG. 6 illustrates the BS's PUSCH procedure with less processing time according to the present invention.

As shown in FIG. 6, the Pcell is cell 1 610 and uplink/downlink configuration 0 is adopted, the Scell is cell 2 612 and uplink/downlink configuration 1 is adopted. According to configuration result in Table 9, the UE will send the PUSCH in uplink subframe 201 (uplink subframe 8) and receives the PHICH in downlink subframe 222 (downlink subframe 1), namely the interval between timing of the BS sending the PHICH and timing of the UE sending the PUSCH is three subframes (3 ms), which is smaller than the processing time of 4 ms provided in LTE and LTE-A. In this instance, the situations which do not meet the processing time requirement cannot be used for uplink transmission, or these may be supported depending on the BS realization. For example, if the BS is fully capable of finishing the process within 3 ms, uplink subframes of these Scells can be scheduled. If the BS is unable to finish the process within 3 ms, uplink subframes of these Scells cannot be scheduled.

When Pcell adopts uplink/downlink configuration 3, an example of following Table 14 shows a timing relation from the PDCCH and the PHICH to the PUSCH corresponding to uplink subframes of the Scell. In Table 14, it is possible that downlink subframe 1 schedules the PUSCH in two uplink subframes. In view of this situation, as to the timing relation from the PDCCH to the PUSCH, downlink subframe 1 may be supported to schedule the PUSCH in two uplink subframes by reusing the uplink index technique in LTE. As to the timing relation from the PDCCH to the PUSCH, downlink subframe 1 may be supported to schedule the PUSCH in two uplink subframes by defining two PHICH resource sets.

TABLE 14

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4 | 6, 7 | — | — | — | 4 | — | — | 4 | 4 |
| 1 | 7 | 7 | — | — | — | — | — | — | 4 | 4 |
| 2 | — | 6 | — | — | — | — | — | — | 4 | — |
| 3 | 4 | | | | | | | | 4 | 4 |
| 4 | — | — | — | — | — | — | — | — | 4 | 4 |
| 5 | — | — | — | — | — | — | — | — | 4 | — |
| 6 | 4 | 6, 7 | — | — | — | — | — | — | 4 | 4 |

Further, in Table 14, if only downlink subframe 1 is supported to schedule two uplink subframes, control channel cost of downlink subframe 1 may increase, so following the processing method of uplink/downlink configuration 0 in LTE and LTE-A, subframe 0 and subframe 1 may be supported to schedule two uplink subframes simultaneously using uplink indexes.

An example of following Table 15 shows the timing relations from PDCCH to PUSCH, wherein both downlink subframe 0 and downlink subframe 1 can schedule uplink subframe 7, so that control channel cost of downlink subframe 1 is reduced. As to the timing relations from the PHICH to the PUSCH, the configuration result in Table 14 may be maintained, or as uplink/downlink configuration 0 in LTE and LTE-A, two PHICH resource sets may be allocated for downlink subframe 0 in order to reduce control channel cost of downlink subframe 1 (special time slot DwPTS), the timing relations from the PDCCH to the PUSCH are as shown in Table 16.

TABLE 15

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | — | — | — | 4 | — | — | 4 | 4 |
| 1 | 7 | 7 | — | — | — | — | — | — | 4 | 4 |
| 2 | — | 6 | — | — | — | — | — | — | 4 | — |
| 3 | 4 | | | | | | | | 4 | 4 |
| 4 | — | — | — | — | — | — | — | — | 4 | 4 |
| 5 | — | — | — | — | — | — | — | — | 4 | — |
| 6 | 4, 7 | 6, 7 | — | — | — | — | — | — | 4 | 4 |

TABLE 16

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 7 | — | — | — | 4 | — | — | 4 | 4 |
| 1 | 7 | 7 | — | — | — | — | — | — | 4 | 4 |
| 2 | — | 6 | — | — | — | — | — | — | 4 | — |
| 3 | 4 | | | | | | | | 4 | 4 |
| 4 | — | — | — | — | — | — | — | — | 4 | 4 |
| 5 | — | — | — | — | — | — | — | — | 4 | — |
| 6 | 4, 7 | 7 | — | — | — | — | — | — | 4 | 4 |

In Tables 14-16, processing time of the BS's receiving PUSCH is reduced. Specifically, when the Scell adopts uplink/downlink configuration 1 or 2, the Scell may encounter the foregoing cases. Similarly, it may be set that uplink subframes of those Scells not meeting the processing time requirement cannot be used for uplink transmission; or, such possibility can be supported depending on the BS realization. For example, if the BS is fully capable of finishing the process within 3 ms, uplink subframes of these Scells can be scheduled. If the BS is unable to finish the process within 3 ms, uplink subframes of these Scells cannot be scheduled.

When the Pcell adopts uplink/downlink configuration 6, because uplink subframes of uplink/downlink configuration 1-5 are all subsets of uplink/downlink configuration 6, a subset of the timing relations from the PDCCH and the PHICH to the PUSCH configured when uplink/downlink configuration 6 is adopted in LTE and LTE-A can be directly reused. As to uplink/downlink configuration 0, two uplink subframes need to be scheduled in downlink subframe 5. The LTE uplink index technique may be reused to support scheduling two uplink subframes.

As shown in the following Table 17, the LTE uplink index technique is reused to support scheduling two uplink subframes in downlink subframe 5; as to the timing relation from the PHICH to the PUSCH, two PHICH resource sets may be defined to support scheduling two uplink subframes in downlink subframe 5.

TABLE 17

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | — | — | — | 4, 7 | 7 | — | — | 5 |
| 1 | 7 | 7 | — | — | — | 7 | 7 | — | — | — |
| 2 | 7 | — | — | — | — | 7 | — | — | — | — |
| 3 | — | — | — | — | — | 7 | 7 | — | — | 5 |
| 4 | — | — | — | — | — | 7 | 7 | — | — | — |
| 5 | — | — | — | — | — | 7 | — | — | — | — |
| 6 | 7 | 7 | — | — | — | 7 | 7 | — | — | 5 |

In Table 17, scheduling two uplink subframes is simultaneously supported only in downlink subframe 5, it may increase control channel cost of subframe 1, so following the processing method of uplink/downlink configuration 0 in LTE and LTE-A, subframe 5 and subframe 6 can be supported to schedule two uplink subframes simultaneously using uplink indexes. The following Table 18 shows the timing relations from the PDCCH to the PUSCH with the above consideration. As to the timing relations from the PHICH to the PUSCH, the configuration result in Table 17 may be maintained.

TABLE 18

| UL/DL Configurations of Scell | Subframe index n | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | — | — | — | 4, 7 | 6, 7 | — | — | 5 |
| 1 | 7 | 7 | — | — | — | 7 | 7 | — | — | — |
| 2 | 7 | — | — | — | — | 7 | — | — | — | — |
| 3 | — | — | — | — | — | 7 | 7 | — | — | 5 |
| 4 | — | — | — | — | — | 7 | 7 | — | — | — |
| 5 | — | — | — | — | — | 7 | — | — | — | — |
| 6 | 7 | 7 | — | — | — | 7 | 7 | — | — | 5 |

Processing time of the BS receiving the PUSCH is reduced in Table 17 and Table 18 under certain cases. When the Scell adopts uplink/downlink configuration 1-5, the Scell may encounter the above mentioned cases. Similarly, it may be set that uplink subframes of those Scells not meeting the processing time requirement cannot be used for uplink transmission, or can be supported depending on the BS realization. If the BS is fully capable of finishing the process within 3 ms, uplink subframes of these Scells can be scheduled, and if the BS is unable to finish the process within 3 ms, uplink subframes of these Scells cannot be scheduled.

2) Assuming that frame edges of cells are unaligned, based on the above four configuration principles mentioned in 1), according to the subframe timing offset of the Pcell and the Scell, the timings from the PDCCH and the PHICH to the PUSCH corresponding to uplink subframes of the Scell can be configured, and the timing from the PUSCH to the PHICH can be calculated. However, this configuration method is excessively complicated.

As to each type of uplink/downlink configurations, assuming that the configuration is used in the Pcell without considering which uplink/downlink configuration the Scell adopts, configure common timing relations from the PDCCH and the PHICH to the PUSCH.

It is assumed that the Pcell adopts uplink/downlink configuration 0, because uplink subframes of other uplink/downlink configurations are all subsets of uplink/downlink configuration 0, a subset of the configuration results of uplink/downlink configuration 0 can be used directly as the configuration result.

1) Assuming that frame edges of cells are aligned.

The timing relation from the PDCCH and the PHICH to the PUSCH and that from the PHICH to the PUSCH will be first introduced.

As to the timing relation from the PDCCH to the PUSCH, in examples of following Tables 19 and 20, some downlink subframes can be supported to schedule two uplink subframes by using the uplink index technique in LTE and LTE-A. When the Scell adopts a certain uplink/downlink configuration, if both of the two uplink subframes scheduled by a certain downlink subframe do not exist, this downlink subframe does not need to schedule the PUSCH. If a certain downlink subframe schedules only one uplink subframe in practice, the uplink index technique can still be used, but the uplink index has to be set as a proper value so as to indicate scheduling this practically existing uplink subframe, or this field in PDCCH can be maintained or explained as a downlink/uplink DAI without using any uplink index, so as to transmit the ACK/NACK information of the PDSCH on the PUSCH.

In Table 19, when the Pcell adopts uplink/downlink configuration 3 and 6, it is in one downlink subframe that the PUSCH of two uplink subframes are scheduled.

TABLE 19

| UL/DL Configurations of Pcell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | | | | 4, 7 | 6, 7 | | | |
| 1 | 4 | 6 | — | — | 4 | 4 | 6 | — | — | 4 |
| 2 | 4 | — | — | 4 | 4 | 4 | — | — | 4 | 4 |
| 3 | 4 | 6, 7 | — | — | — | 4 | — | — | 4 | 4 |
| 4 | 4 | 6 | — | — | 4 | 4 | — | — | 4 | 4 |
| 5 | 4 | — | — | 4 | 4 | 4 | — | — | 4 | 4 |
| 6 | 7 | 7 | — | — | — | 4, 7 | 7 | — | — | 5 |

In Table 19, if only in a downlink subframe that scheduling two uplink subframes simultaneously is supported, the control channel cost of this downlink subframe may be increased. As shown in an example of following Table 20, following the configuration of uplink/downlink configuration 0 in LTE and LTE-A, the two downlink subframes can be supported to schedule three uplink subframes simultaneously using uplink index technique. For example, downlink subframe 0 and downlink subframe 1 schedule uplink subframe 4, uplink subframe 7 and uplink subframe 8.

TABLE 20

| UL/DL Configurations of Pcell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | | | | 4, 7 | 6, 7 | | | |
| 1 | 4 | 6 | — | — | 4 | 4 | 6 | — | — | 4 |
| 2 | 4 | — | — | 4 | 4 | 4 | — | — | 4 | 4 |
| 3 | 4, 7 | 6, 7 | — | — | — | 4 | — | — | 4 | 4 |
| 4 | 4 | 6 | — | — | 4 | 4 | — | — | 4 | 4 |
| 5 | 4 | — | — | 4 | 4 | 4 | — | — | 4 | 4 |
| 6 | 7 | 7 | — | — | — | 4, 7 | 6, 7 | — | — | 5 |

According to Tables 19 and 20, timing relations from the PHICH to the PUSCH are as shown in examples of following Tables 21 and 22, respectively.

TABLE 21

| UL/DL Configurations of Pcell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 7 | | | | 4, 7 | 7 | | | |
| 1 | 4 | 6 | — | — | 4 | 4 | 6 | — | — | 4 |
| 2 | 4 | — | — | 4 | 4 | 4 | — | — | 4 | 4 |
| 3 | 4 | 6, 7 | — | — | — | 4 | — | — | 4 | 4 |
| 4 | 4 | 6 | — | — | 4 | 4 | — | — | 4 | 4 |
| 5 | 4 | — | — | 4 | 4 | 4 | — | — | 4 | 4 |
| 6 | 7 | 7 | — | — | — | 4, 7 | 7 | — | — | 5 |

TABLE 22

| UL/DL Configurations of Pcell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 7 | | | | 4, 7 | 7 | | | |
| 1 | 4 | 6 | — | — | 4 | 4 | 6 | — | — | 4 |
| 2 | 4 | — | — | 4 | 4 | 4 | — | — | 4 | 4 |
| 3 | 4, 7 | 7 | — | — | — | 4 | — | — | 4 | 4 |
| 4 | 4 | 6 | — | — | 4 | 4 | — | — | 4 | 4 |
| 5 | 4 | — | — | 4 | 4 | 4 | — | — | 4 | 4 |
| 6 | 7 | 7 | — | — | — | 4, 7 | 7 | — | — | 5 |

In Tables 19-22, processing time of the BS receiving the PUSCH sent by the UE is reduced in certain cases. Similarly, it can be set that the uplink subframes of the Scell not meeting the processing time requirement cannot be used for uplink transmission, or such possibility can be supported depending on the BS realization. For example, if the BS is fully capable of finishing the process within 3 ms, uplink subframes of these Scells can be scheduled, and if the BS is unable to finish the process within 3 ms, uplink subframes of these Scells can not be scheduled.

2) Assuming that frame edges of cells are unaligned.

As to each uplink/downlink configuration, assuming that it is applied in a Pcell and is irrelevant with the uplink/downlink configuration adopted by the Scell but depends in subframe timing offset of the two cells, configure a unique and common timing from the PDCCH/PHICH to the PUSCH. Specifically, according to when the Scell configures the largest number of uplink subframes (namely uplink/downlink configuration 0) as well as subframe timing offset of the two cells, configure timing relations from the PDCCH/PHICH to the PUSCH, and apply a subset of the timing relations in other uplink/downlink configurations.

Embodiment 2

As to cross-carrier scheduling, the timing relations from the PDCCH and the PHICH to the PUSCH are completely reconfigured without reusing the configuration results in LTE and LTE-A, which helps optimize HARQ processing time. According to the timing relations from the PDCCH and the PHICH to the PUSCH of the Scell, the timing relation from the PUSCH to the PHICH can be calculated correspondingly according to the previous calculating method.

The following two methods can be adopted to configure the timing relations from the PDCCH and the PHICH to the PUSCH in this embodiment 2.

First, according to various combinations of different uplink/downlink configurations adopted by the Pcell and the Scell, the timing relations from the PDCCH and the PHICH to the PUSCH as well as that from the PUSCH to the PHICH corresponding to uplink subframes of the Scell can be configured respectively. The above-mentioned combinations of uplink/downlink configurations can be optimized respectively. Because LTE and LTE-A supports 7 types of TDD uplink/downlink configurations, as to each type of uplink/downlink configuration, assuming that one configuration is used for the Pcell, the timing relations from the PDCCH and the PHICH to the PUSCH for the other 6 types of uplink/downlink configurations have to be configured correspondingly, which means that at most 42 types of timing relations have to be configured.

1) Assuming that frame edges of cells are aligned.

When the Pcell adopts uplink/downlink configuration 1, 2, 4 or 5, the configuration results as shown in Tables 5-8 are the optimal timing relations from the PDCCH and the PHICH to the PUSCH. This is compatible with timings in LTE and LTE-A.

When the Pcell adopts uplink/downlink configuration 0, Tables 9-13 show the optimal timing relations from the PDCCH and the PHICH to the PUSCH. This it is compatible with timings in LTE and LTE-A.

When the Pcell adopts uplink/downlink configuration 3, by reconfiguring the timing relations from the PDCCH and the PHICH to the PUSCH of all uplink subframes, the delay from the PDCCH and the PHICH to the PUSCH can be reduced, and the situation of needing to schedule two uplink subframes in one subframe can be avoided. The configuration result is as shown in an example of following Table 23.

TABLE 23

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | — | — | — | 4 | — | 5 | 5 | 5 |
| 1 | 7 | 7 | — | — | — | — | — | — | 4 | 4 |
| 2 | — | 6 | — | — | — | — | — | — | 4 | — |
| 3 | 4 | | | | | | | | 4 | 4 |
| 4 | — | — | — | — | — | — | — | — | 4 | 4 |
| 5 | — | — | — | — | — | — | — | — | 4 | — |
| 6 | 7 | 7 | — | — | — | — | — | 5 | 5 | 5 |

In order to satisfy processing time of the BS receiving the PUSCH by guaranteeing that the time duration between receiving uplink subframes of the PUSCH and sending downlink subframes of the PHICH corresponding to the PUSCH is greater than 4 ms, as to when the Scell adopts uplink/downlink configuration 1, uplink index technique can be used in downlink subframe 1 so as to enable downlink subframe 1 to support scheduling two uplink subframes, which guarantees that synchronous HARQ transmission of the PUSCH in uplink subframe 8 is backward compatible with processing times of the UE and the BS. An example of following Table 24 shows the timing relations from the PDCCH to the PUSCH in this instance.

TABLE 24

| Configuration serial number of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | — | — | — | 4 | — | 5 | 5 | 5 |
| 1 | 7 | 6, 7 | — | — | — | — | — | — | 4 | 4 |
| 2 | — | 6 | — | — | — | — | — | — | 4 | — |
| 3 | 4 | | | | | | | | 4 | 4 |
| 4 | — | — | — | — | — | — | — | — | 4 | 4 |
| 5 | — | — | — | — | — | — | — | — | 4 | — |
| 6 | 7 | 7 | — | — | — | — | — | 5 | 5 | 5 |

Correspondingly, two PHICH resource sets are allocated in uplink subframe 1, so that uplink subframe 1 supports scheduling two uplink subframes, and Table 25 shows the timing from the PDCCH to the PUSCH in this instance.

TABLE 25

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | — | — | — | 4 | — | 5 | 5 | 5 |
| 1 | | 6, 7 | — | — | — | — | — | — | 4 | 4 |
| 2 | — | 6 | — | — | — | — | — | — | 4 | — |
| 3 | 4 | | | | | | | | 4 | 4 |
| 4 | — | — | — | — | — | — | — | — | 4 | 4 |
| 5 | — | — | — | — | — | — | — | — | 4 | — |
| 6 | 7 | 7 | — | — | — | — | — | 5 | 5 | 5 |

When the Pcell adopts uplink/downlink configuration 6, by reconfiguring the timings from the PDCCH and the PHICH to the PUSCH corresponding to uplink subframes of the Scell, the delay from the PDCCH and the PHICH to the PUSCH can be reduced.

An example of following Table 26 shows the timing from the PDCCH to the PUSCH. When the Scell adopts uplink/downlink configuration 0, because number of available downlink subframes is smaller than that of uplink subframes, at least one downlink subframe has to schedule two uplink subframes, which may increase control channel cost of this downlink subframe, following the uplink index technique of uplink/downlink configuration 0 in LTE and LTE-A, subframe 5 and subframe 6 may be supported to schedule two uplink subframes simultaneously.

TABLE 26

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | — | — | — | 4, 7 | 6, 7 | — | — | 5 |
| 1 | 7 | 7 | — | — | | | 6 | — | — | 4 |
| 2 | | 6 | — | — | — | | 6 | — | — | — |
| 3 | 4 | — | — | — | | | 6 | — | — | 4 |
| 4 | — | — | — | — | | | 6 | — | — | 4 |
| 5 | — | — | — | — | | | 6 | — | — | — |
| 6 | 7 | 7 | | | | | 7 | 7 | | 5 |

Correspondingly, an example of following Table 27 shows the timing from the PHICH to the PUSCH. As to the situation when the Scell adopts uplink/downlink configuration 0, downlink subframe 5 of the Pcell is configured with two PHICH resource sets.

TABLE 27

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | — | — | — | 4, 7 | 7 | — | — | 5 |
| 1 | 7 | 7 | — | — | | | 6 | — | — | 4 |
| 2 | | 6 | — | — | — | | 6 | — | — | — |
| 3 | 4 | — | — | — | | | 6 | — | — | 4 |
| 4 | — | — | — | — | | | 6 | — | — | 4 |
| 5 | — | — | — | — | | | 6 | — | — | — |
| 6 | 7 | 7 | | | | | 7 | 7 | | 5 |

In order to satisfy the processing time of the BS receiving the PUSCH, when the Scell adopts uplink/downlink configuration 1, uplink index technique can be used in downlink subframe 1 so as to enable downlink subframe 1 to support scheduling two uplink subframes, which guarantees that synchronous HARQ transmission of PUSCH in uplink subframe 7 is backward compatible with processing times of the UE and the BS. Table 28 shows the timing relations from the PDCCH to the PUSCH in this instance.

TABLE 28

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | — | — | — | 4, 7 | 6, 7 | — | — | 5 |
| 1 | 7 | 6, 7 | — | — | | | 6 | — | — | 4 |
| 2 | | 6 | — | — | — | | 6 | — | — | — |
| 3 | 4 | — | — | — | | | 6 | — | — | 4 |
| 4 | — | — | — | — | | | 6 | — | — | 4 |
| 5 | — | — | — | — | | | 6 | — | — | — |
| 6 | 7 | 7 | | | | | 7 | 7 | | 5 |

Correspondingly, two PHICH resource sets are allocated in uplink subframe 1, so that uplink subframe 1 supports scheduling two uplink subframes, and an example of following Table 29 shows the timing from the PDCCH to the PUSCH in this instance.

TABLE 29

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | — | — | — | 4, 7 | 7 | — | — | 5 |
| 1 | | 6, 7 | — | — | | | 6 | — | — | 4 |
| 2 | | 6 | — | — | — | | 6 | — | — | — |
| 3 | 4 | — | — | — | | | 6 | — | — | 4 |
| 4 | — | — | — | — | | | 6 | — | — | 4 |
| 5 | — | — | — | — | | | 6 | — | — | — |
| 6 | 7 | 7 | | | | | 7 | 7 | | 5 |

In Tables 23-29, processing time of the BS receiving the PUSCH is reduced. Thus, it may be set that uplink subframes of those Scells not meeting the processing time requirement cannot be used for uplink transmission; or, such possibility can be supported depending on the BS realization. For example, if the BS is fully capable of finishing the process within 3 ms, uplink subframes of these Scells can be scheduled, and if the BS is unable to finish the process within 3 ms, uplink subframes of these Scells cannot be scheduled.

The UE receives the PDCCH and the PHICH, the operation of decoding uplink data is less complicated, and the PDCCH and the PHICH are located in the first 3 OFDM symbols in a downlink subframe. The UE need not wait for the entire downlink subframe to end before decoding the PDCCH and the PHICH, so that the UE has more time to process the PDCCH and the PHICH. Another processing method is to guarantee backward compatibility of the processing time of the BS receiving the PUSCH, and allow the UE to more quickly receive the PDCCH and the PHICH. Specifically, the method is to guarantee that the time interval from the PUSCH to the corresponding PHICH is greater than or equal to k ms, and that the time interval from the PDCCH and the PHICH to the PUSCH is greater than or equal to (k−1)ms, wherein k can be set according to LTE, namely k=4.

In examples of following Tables 30-34, the time interval from the PDCCH and the PHICH to the PUSCH is reduced only when the time interval from the PUSCH to the PHICH of the Scell is smaller than k ms, and the processing time requirement backward compatible with LTE and LTE-A is maintained under other situations.

Tables 30 and 31 show the timing relation from the PDCCH to the PUSCH and the timing relation from the PHICH to the PUSCH respectively when the Pcell adopts uplink/downlink configuration 0.

TABLE 30

| UL/DL Configurations of Scell | Downlink subframe index n of Pcell ||||||||||
|---|---|---|---|---|---|---|---|---|---|---|
| | 0 | 1 | 2 | 3 | 4 | 5 | 6 | 7 | 8 | 9 |
| 0 | 4, 7 | 6, 7- | — | — | — | 4, 7 | 6, 7- | — | — | — |
| 1 | 3 | 6 | — | — | — | 3 | 6 | — | — | — |
| 2 | — | 6 | — | — | — | — | 6 | — | — | — |
| 3 | 3 | 3 | — | — | — | — | 6 | — | — | — |
| 4 | 3 | — | — | — | — | — | 6 | — | — | — |
| 5 | — | — | — | — | — | — | 6 | — | — | — |
| 6 | 4, 7 | 6, 7- | — | — | — | 7 | 7 | — | — | — |

TABLE 31

| UL/DL Configurations of Scell | Downlink subframe index n of Pcell ||||||||||
|---|---|---|---|---|---|---|---|---|---|---|
| | 0 | 1 | 2 | 3 | 4 | 5 | 6 | 7 | 8 | 9 |
| 0 | 4, 7 | 7- | — | — | — | 4, 7 | 7- | — | — | — |
| 1 | 3 | 6 | — | — | — | 3 | 6 | — | — | — |
| 2 | — | 6 | — | — | — | — | 6 | — | — | — |
| 3 | 3 | 3 | — | — | — | — | 6 | — | — | — |
| 4 | 3 | — | — | — | — | — | 6 | — | — | — |
| 5 | — | — | — | — | — | — | 6 | — | — | — |
| 6 | 4, 7 | 7- | — | — | — | 7 | 7 | — | — | — |

Table 32 shows the timing relation from the PDCCH and the PHICH to the PUSCH when the Pcell adopts uplink/downlink configuration 3.

TABLE 32

| UL/DL Configurations of Scell | Downlink subframe index n of Pcell ||||||||||
|---|---|---|---|---|---|---|---|---|---|---|
| | 0 | 1 | 2 | 3 | 4 | 5 | 6 | 7 | 8 | 9 |
| 0 | 7 | 7 | — | — | — | 4 | — | 5 | 5 | 5 |
| 1 | — | 6 | — | — | — | 3 | — | — | 4 | 4 |
| 2 | — | 6 | — | — | — | — | — | — | 4 | — |
| 3 | 4 | — | — | — | — | — | — | — | 4 | 4 |
| 4 | — | — | — | — | — | — | — | — | 4 | 4 |
| 5 | — | — | — | — | — | — | — | — | 4 | — |
| 6 | 7 | 7 | — | — | — | — | — | 5 | 5 | 5 |

Tables 33 and 34 show the timing relation from the PDCCH to the PUSCH and the timing relation from the PHICH to the PUSCH respectively when the Pcell adopts uplink/downlink configuration 6.

TABLE 33

| UL/DL Configurations of Scell | Downlink subframe index n of Pcell ||||||||||
|---|---|---|---|---|---|---|---|---|---|---|
| | 0 | 1 | 2 | 3 | 4 | 5 | 6 | 7 | 8 | 9 |
| 0 | 7 | 7 | — | — | — | 4, 7 | 6, 7 | — | — | 5 |
| 1 | — | 6 | — | — | — | 3 | 6 | — | — | 4 |
| 2 | — | 6 | — | — | — | — | 6 | — | — | — |
| 3 | 4 | — | — | — | — | — | 6 | — | — | 4 |
| 4 | — | — | — | — | — | — | 6 | — | — | 4 |
| 5 | — | — | — | — | — | — | 6 | — | — | — |
| 6 | 7 | 7 | — | — | — | 7 | 7 | — | — | 5 |

TABLE 34

| UL/DL Configurations of Scell | Downlink subframe index n of Pcell ||||||||||
|---|---|---|---|---|---|---|---|---|---|---|
| | 0 | 1 | 2 | 3 | 4 | 5 | 6 | 7 | 8 | 9 |
| 0 | 7 | 7 | — | — | — | 4, 7 | 7 | — | — | 5 |
| 1 | — | 6 | — | — | — | 3 | 6 | — | — | 4 |
| 2 | — | 6 | — | — | — | — | 6 | — | — | — |
| 3 | 4 | — | — | — | — | — | 6 | — | — | 4 |
| 4 | — | — | — | — | — | — | 6 | — | — | 4 |
| 5 | — | — | — | — | — | — | 6 | — | — | — |
| 6 | 7 | 7 | — | — | — | 7 | 7 | — | — | 5 |

In alternative embodiments, in Tables 35-40, the time intervals from the PDCCH and the PHICH to the PUSCH are reduced for all configurations adopted by the Scell.

Tables 35 and 36 respectively show the timing relation from the PDCCH to the PUSCH and the timing relation from the PHICH to the PUSCH respectively when the Pcell adopts uplink/downlink configuration 0.

TABLE 35

| UL/DL Configurations of Scell | Downlink subframe index n of Pcell ||||||||||
|---|---|---|---|---|---|---|---|---|---|---|
| | 0 | 1 | 2 | 3 | 4 | 5 | 6 | 7 | 8 | 9 |
| 0 | 3, 4 | 3, 6 | — | — | — | 3, 4 | 3, 6 | — | — | — |
| 1 | 3 | 6 | — | — | — | 3 | 6 | — | — | — |
| 2 | — | 6 | — | — | — | — | 6 | — | — | — |
| 3 | 3 | 3 | — | — | — | — | 6 | — | — | — |
| 4 | 3 | — | — | — | — | — | 6 | — | — | — |
| 5 | — | — | — | — | — | — | 6 | — | — | — |
| 6 | 3, 4 | 3, 6 | — | — | — | 3 | 6 | — | — | — |

TABLE 36

| UL/DL Configurations of Scell | Downlink subframe index n of Pcell ||||||||||
|---|---|---|---|---|---|---|---|---|---|---|
| | 0 | 1 | 2 | 3 | 4 | 5 | 6 | 7 | 8 | 9 |
| 0 | 3, 4 | 6 | — | — | — | 3, 4 | 6 | — | — | — |
| 1 | 3 | 6 | — | — | — | 3 | 6 | — | — | — |
| 2 | — | 6 | — | — | — | — | 6 | — | — | — |
| 3 | 3 | 3 | — | — | — | — | 6 | — | — | — |
| 4 | 3 | — | — | — | — | — | 6 | — | — | — |
| 5 | — | — | — | — | — | — | 6 | — | — | — |
| 6 | 3, 4 | 6 | — | — | — | 3 | 6 | — | — | — |

Table 37 shows the timing relations from the PDCCH and the PHICH to the PUSCH when the Pcell adopts uplink/downlink configuration 1, 2, 4 or 5.

TABLE 37

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 3 | 3 | — | — | 3 | 3 | 3 | — | — | 3 |
| 1 | 3 | — | — | — | 3 | 3 | — | — | — | 3 |
| 2 | — | — | — | — | 3 | — | — | — | — | 3 |
| 3 | 3 | 3 | — | — | — | — | — | — | — | 3 |
| 4 | 3 | — | — | — | — | — | — | — | — | 3 |
| 5 | — | — | — | — | — | — | — | — | — | 3 |
| 6 | 3 | 3 | — | — | 3 | 3 | — | — | — | 3 |

Table 38 shows the timing relation from the PDCCH and the PHICH to the PUSCH when the Pcell adopts uplink/downlink configuration 3.

TABLE 38

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 3 | 3 | — | 4 | 4 |
| 1 | 3 | 6 | — | — | — | 3 | — | — | — | 3 |
| 2 | — | 6 | — | — | — | — | — | — | — | 3 |
| 3 | 3 | 3 | — | — | — | — | — | — | — | 3 |
| 4 | 3 | — | — | — | — | — | — | — | — | 3 |
| 5 | — | — | — | — | — | — | — | — | — | 3 |
| 6 | 4 | 6 | — | — | — | 3 | — | — | 4 | 4 |

Table 39 and Table 40 respectively show the timing relation from the PDCCH to the PUSCH and the timing relation from PHICH to PUSCH respectively when the Pcell adopts uplink/downlink configuration 6.

TABLE 39

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 3, 4 | 3, 6 | — | — | 4 |
| 1 | 3 | 6 | — | — | — | 3 | — | — | — | 3 |
| 2 | — | 6 | — | — | — | — | — | — | — | 3 |
| 3 | 3 | 3 | — | — | — | — | — | — | — | 3 |
| 4 | 3 | — | — | — | — | — | — | — | — | 3 |
| 5 | — | — | — | — | — | — | — | — | — | 3 |
| 6 | 4 | 6 | — | — | — | 3 | 6 | — | — | 4 |

TABLE 40

| UL/DL Configurations of Scell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 3, 4 | 6 | — | — | 4 |
| 1 | 3 | 6 | — | — | — | 3 | — | — | — | 3 |
| 2 | — | 6 | — | — | — | — | — | — | — | 3 |
| 3 | 3 | 3 | — | — | — | — | — | — | — | 3 |
| 4 | 3 | — | — | — | — | — | — | — | — | 3 |
| 5 | — | — | — | — | — | — | — | — | — | 3 |
| 6 | 4 | 6 | — | — | — | 3 | 6 | — | — | 4 |

2) Assuming that frame edges of cells are unaligned.

Based on the four configuration principles of the present invention, the timing relations from the PDCCH and the PHICH to the PUSCH can be configured by combining uplink/downlink configurations of the Pcell and the Scell and considering the subframe timing offset of the Pcell and the Scell. However, this method is excessively complicated.

Second, assuming that each uplink/downlink configuration is applied in assuming that Pcell irrelevant from the uplink/downlink configuration the Scell adopts, configure unique common timing relations from the PDCCH and the PHICH to the PUSCH.

1) Assuming that frame edges of cells are aligned.

The timing relations are configured from the PDCCH and the PHICH to the PUSCH according to when the Pcell adopts uplink/downlink configuration 0, and apply a subset of the configuration result to other uplink/downlink configurations. For some Scell configurations, some downlink subframes need supporting scheduling 2 uplink subframes, but for other configurations of the Scell, if only one uplink subframe exists in the Scell, the uplink index technique can still be used, but the uplink index needs to be set with a proper value to indicate the scheduling of the PUSCH of this uplink subframe. Alternatively, the uplink index in the downlink subframe of the Pcell may be unused, and this field in the PDCCH may be reserved or explained as a Downlink Allocation Index (DAI). The examples of following Tables 41 and 42 show the timing relation configuration result from the PDCCH to the PUSCH and that from the PHICH to the PUSCH.

TABLE 41

| UL/DL Configurations of Pcell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | — | — | — | 4, 7 | 6, 7 | — | — | — |
| 1 | 4 | 6 | — | — | 4 | 4 | 6 | — | — | 4 |
| 2 | 4 | — | — | 4 | 4 | 4 | — | — | 4 | 4 |
| 3 | 7 | 7 | — | — | — | 4 | — | 5 | 5 | 5 |
| 4 | 4 | 6 | — | — | 4 | 4 | — | — | 4 | 4 |
| 5 | 4 | — | — | 4 | 4 | 4 | — | — | 4 | 4 |
| 6 | 7 | 7 | — | — | — | 4, 7 | 6, 7 | — | — | 5 |

TABLE 42

| UL/DL Configurations of Pcell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 7 | — | — | — | 4, 7 | 7 | — | — | — |
| 1 | 4 | 6 | — | — | 4 | 4 | 6 | — | — | 4 |
| 2 | 4 | — | — | 4 | 4 | 4 | — | — | 4 | 4 |
| 3 | 7 | 7 | — | — | — | 4 | — | 5 | 5 | 5 |
| 4 | 4 | 6 | — | — | 4 | 4 | — | — | 4 | 4 |
| 5 | 4 | — | — | 4 | 4 | 4 | — | — | 4 | 4 |
| 6 | 7 | 7 | — | — | — | 4, 7 | 7 | — | — | 5 |

In Tables 41 and 42, processing time of the BS receiving the PUSCH is reduced in certain cases. Thus, it may be set that uplink subframes of those Scells not meeting the processing time requirement cannot be used for uplink transmission, or may be used depending on the BS realization. For example, if the BS is fully capable of finishing the process within 3 ms, uplink subframes of these Scells can be scheduled, and if the BS is unable to finish the process within 3 ms, uplink subframes of these Scells cannot be scheduled.

In addition, another processing method is to guarantee backward compatibility of the processing time of the BS receiving the PUSCH, and allow the UE to more quickly receive the PDCCH and the PHICH. Specifically, it is guaranteed that the time interval from the PUSCH to corresponding PHICH is greater than or equal to k ms, and that the time interval from the PDCCH and the PHICH to the PUSCH is greater than or equal to (k−1)ms, wherein k can be set according to LTE, namely k=4. The following Tables 43 and 44 show the timing relation from the PDCCH to the PUSCH and that from the PHICH to the PUSCH, respectively.

TABLE 43

| UL/DL Configurations of Pcell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 3, 4 | 3, 6 | — | — | — | 3, 4 | 3, 6 | — | — | — |
| 1 | 3 | 3 | — | — | 3 | 3 | 3 | — | — | 3 |
| 2 | 3 | 3 | — | — | 3 | 3 | 3 | — | — | 3 |
| 3 | 4 | 6 | — | — | — | 3 | 3 | — | 4 | 4 |
| 4 | 3 | 3 | — | — | 3 | 3 | 3 | — | — | 3 |
| 5 | 3 | 3 | — | — | 3 | 3 | 3 | — | — | 3 |
| 6 | 4 | 6 | — | — | — | 3, 4 | 3, 6 | — | — | 4 |

TABLE 44

| UL/DL Configurations of Pcell | Downlink subframe index n of Pcell | | | | | | | | | |
|---|---|---|---|---|---|---|---|---|---|---|
| | 0 | 1 | 2 | 3 | 4 | 5 | 6 | 7 | 8 | 9 |
| 0 | 3, 4 | 6 | — | — | — | 3, 4 | 6 | — | — | — |
| 1 | 3 | 3 | — | — | 3 | 3 | 3 | — | — | 3 |
| 2 | 3 | 3 | — | — | 3 | 3 | 3 | — | — | 3 |
| 3 | 4 | 6 | — | — | — | 3 | 3 | — | 4 | 4 |
| 4 | 3 | 3 | — | — | 3 | 3 | 3 | — | — | 3 |
| 5 | 3 | 3 | — | — | 3 | 3 | 3 | — | — | 3 |
| 6 | 4 | 6 | — | — | — | 3, 4 | 6 | — | — | 4 |

2) Assuming that frame edges of cells are unaligned.

As to each TDD uplink/downlink configuration, assuming that it is applied in the Pcell irrelevant from the uplink/downlink configuration the Scell adopts, reconfigure unique common timings from the PDCCH/PHICH to the PUSCH according to subframe timing offset of the two cells. Specifically, according to when the Scell configures the largest number of uplink subframes (namely uplink/downlink configuration 0) as well as subframe timing offset of the two cells, configure the timing relations from the PDCCH/PHICH to the PUSCH, apply a subset of the timing relations in other uplink/downlink configurations.

Figure 7:
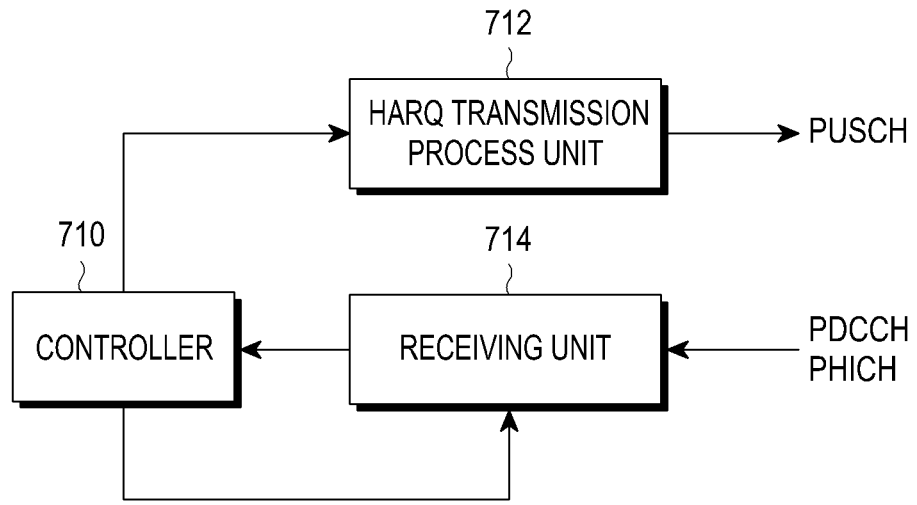
FIG. 7 illustrates a structure in a UE for performing synchronous HARQ transmission of Uplink according an embodiment of the present invention.

FIG. 7 illustrates a structure in a UE for performing synchronous HARQ transmission of Uplink according an embodiment of the present invention. As shown, HARQ transmission apparatus in the UE comprises a controller 710, a HARQ transmission process unit 712, and receiving unit 714.

The HARQ transmission process unit 712 is configured for comprising at least one HARQ transmission process, each of which sends or resends uplink data via the PUSCH at timing positions according preconfigured timing relations of one of above embodiments. The receiving unit 714 receives the PUSCH scheduling and control information in the PDCCH and/or HARQ indication information in the PHICH at timing positions according the timing relations, and provides the information to the controller 710.

The controller 710 configures the UE to operate in CA mode under a control of the BS, and determines timing positions of the PDCCH, the PHICH, and transmission and retransmission of the PUSCH according to at least one of timing relations from the PDCCH and the PHICH to the PUSCH, timing relations from the PUSCH to the PHICH, and timing relation from the PHICH to the PUSCH to control the timing positions the HARQ transmission process unit 712 and the receiving unit 714.

Figure 8:
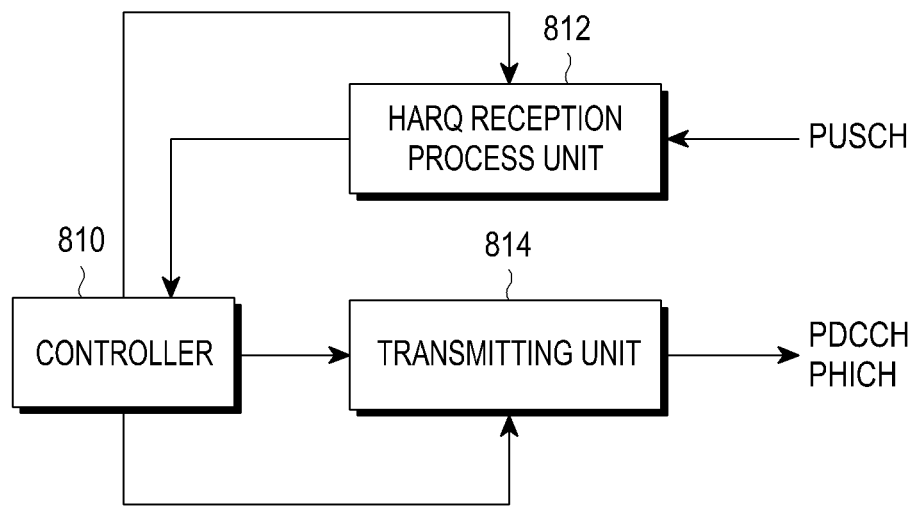
FIG. 8 illustrates a structure in a BS for supporting synchronous HARQ transmission of Uplink according to an embodiment of the present invention.

FIG. 8 illustrates a structure in a BS for supporting synchronous HARQ transmission of Uplink according to an embodiment of the present invention. As shown, HARQ transmission supporting apparatus in the BS comprises a controller 810, a HARQ reception process unit 812, and transmitting unit 814.

The HARQ reception process unit 812 comprises at least one HARQ reception process corresponding at least one HARQ transmission process in the UE, wherein each HARQ reception process receives uplink transmission or retransmission data via the PUSCH at timing positions according preconfigured timing relations of one of above embodiments. The transmitting unit 814 transmits the PUSCH scheduling and control information in the PDCCH and/or HARQ indication information in the PHICH at timing positions according the preconfigured timing relations.

The controller 810 configures the UE to operate in CA mode, and determines timing positions of the PDCCH, the PHICH, and transmission and retransmission of the PUSCH according to at least one of timing relations from the PDCCH and the PHICH to the PUSCH, timing relations from the PUSCH to the PHICH, and timing relation from the PHICH to the PUSCH to control the timing positions of the HARQ reception process unit 812 and the transmitting unit 814.

The foregoing embodiments of the present invention are not used to confine the present invention, and any modification, equivalent substitute and improvement within spirit of the present invention are under the scope of the present invention.

What is claimed is:

1. A method for transmitting/receiving a signal in a user equipment (UE) in a wireless communication system supporting a hybrid automatic repeat request (HARQ) scheme, the method comprising:
   receiving control information on a physical downlink control channel (PDCCH) in a primary cell at a predetermined downlink subframe; and
   transmitting data on a physical uplink shared channel (PUSCH) at a first uplink subframe allocated in a secondary cell based on the received control information,
   wherein the predetermined downlink subframe on the PDCCH is determined based on a type of a subframe in the primary cell posited at a same timing position with the first uplink subframe and at least one of a uplink/downlink configuration adopted in each of the primary cell and the secondary cell, and the uplink/downlink configuration adopted in the primary cell is different from the uplink/downlink configuration adopted in the secondary cell.

2. The method of claim 1, when the type of the subframe in the primary cell is a uplink subframe, the predetermined downlink subframe is a downlink subframe allocated for scheduling of the uplink subframe in the primary cell.

3. The method of claim 1, when the type of the subframe in the primary cell is a downlink subframe, the predetermined downlink subframe on the PDCCH is determined among a plurality of uplink subframes allocated in the primary cell based on the uplink/downlink configuration adopted in each of the primary cell and the secondary cell.

4. The method of claim 1, further comprising:
   receiving indication information on a physical HARQ indicator channel (PHICH) in the primary cell at a predetermined downlink subframe; and
   retransmitting the data on the PUSCH at a second uplink subframe allocated in the secondary cell based on the received indication information, wherein the predetermined downlink subframe on the PHICH is determined based on a type of a subframe in the primary cell posited at a same timing position with the second uplink subframe and at least one of a uplink/downlink configuration adopted in each of the primary cell and the secondary cell, and the uplink/downlink configuration adopted in the primary cell is different from the uplink/downlink configuration adopted in the secondary cell.

5. The method of claim 4, when the type of the subframe in the primary cell is a uplink subframe, the predetermined downlink subframe on the PHICH is a downlink subframe allocated for scheduling of the uplink subframe in the primary cell.

6. The method of claim 4, when the type of the subframe in the primary cell is a downlink subframe, the predetermined downlink subframe on the PHICH is determined among a plurality of uplink subframes allocated in the primary cell based on the uplink/downlink configuration adopted in each of the primary cell and the secondary cell.

7. A method for transmitting/receiving a signal in a base station (BS) in a wireless communication system supporting a hybrid automatic repeat request (HARQ) scheme, the method comprising:
  transmitting control information on a physical downlink control channel (PDCCH) in a primary cell at a predetermined downlink subframe; and
  receiving data on a physical uplink shared channel (PUSCH) at a first uplink subframe allocated in a secondary cell based on the control information,
  wherein the predetermined downlink subframe on the PDCCH is determined based on a type of a subframe in the primary cell posited at a same timing position with the first uplink subframe and at least one of a uplink/downlink configuration adopted in each of the primary cell and the secondary cell, and the uplink/downlink configuration adopted in the primary cell is different from the uplink/downlink configuration adopted in the secondary cell.

8. The method of claim 7, when the type of the subframe in the primary cell is a uplink subframe, the predetermined downlink subframe on the PDCCH is a downlink subframe allocated for scheduling of the uplink subframe in the primary cell.

9. The method of claim 7, when the type of the subframe in the primary cell is a downlink subframe, the predetermined downlink subframe on the PDCCH is determined among a plurality of uplink subframes allocated in the primary cell based on the uplink/downlink configuration adopted in each of the primary cell and the secondary cell.

10. The method of claim 7, Further comprising:
  transmitting indication information on a physical HARQ indicator channel (PHICH) in the primary cell at a predetermined downlink subframe; and
  receiving the data on the PUSCH at a second uplink subframe allocated in a secondary cell based on the transmitted indication information,
  wherein the predetermined downlink subframe on the PHICH is determined based on a type of a subframe in the primary cell posited at a same timing position with the second uplink subframe and at least one of a uplink/downlink configuration adopted in each of the primary cell and the secondary cell, and the uplink/downlink configuration adopted in the primary cell is different from the uplink/downlink configuration adopted in the secondary cell.

11. The method of claim 10, when the type of the subframe in the primary cell is a uplink subframe, the predetermined downlink subframe on the PHICH is a downlink subframe allocated for scheduling of the uplink subframe in the primary cell.

12. The method of claim 10, when the type of the subframe in the primary cell is a downlink subframe, the predetermined downlink subframe on the PHICH is determined among a plurality of uplink subframes allocated in the primary cell based on the uplink/downlink configuration adopted in each of the primary cell and the secondary cell.

13. A user equipment (UE) for transmitting/receiving a signal in a wireless communication system supporting a hybrid automatic repeat request (HARQ) scheme, comprising:
  a receiver configured to receive control information on a physical downlink control channel (PDCCH) in a primary cell at a predetermined downlink subframe; and
  a transmitter configured to transmit data on a physical uplink shared channel (PUSCH) at a first uplink subframe allocated in a secondary cell based on the received control information,
  wherein the predetermined downlink subframe on the PDCCH is determined based on a type of a subframe in the primary cell posited at a same timing position with the first uplink subframe and at least one of a uplink/downlink configuration adopted in each of the primary cell and the secondary cell, and the uplink/downlink configuration adopted in the primary cell is different from the uplink/downlink configuration adopted in the secondary cell.

14. The UE of claim 13, when the type of the subframe in the primary cell is a uplink subframe, the predetermined downlink subframe on the PDCCH is a downlink subframe allocated for scheduling of the uplink subframe in the primary cell.

15. The UE of claim 13, when the type of the subframe in the primary cell is a downlink subframe, the predetermined downlink subframe on the PDCCH is determined among a plurality of uplink subframes allocated in the primary cell based on the uplink/downlink configuration adopted in each of the primary cell and the secondary cell.

16. The UE of claim 13, wherein the receiver receives indication information on a physical HARQ indicator channel (PHICH) in the primary cell at a predetermined downlink subframe, and the transmitter retransmits the data on the PUSCH at a second uplink subframe allocated in the secondary cell based on the received indication information, and
  wherein the predetermined downlink subframe on the PHICH is determined based on a type of a subframe in the primary cell posited at a same timing position with the second uplink subframe and at least one of a uplink/downlink configuration adopted in each of the primary cell and the secondary cell, and the uplink/downlink configuration adopted in the primary cell is different from the uplink/downlink configuration adopted in the secondary cell.

17. The UE of claim 16, when the type of the subframe in the primary cell is a uplink subframe, the predetermined downlink subframe on the PHICH is a downlink subframe allocated for scheduling of the uplink subframe in the primary cell.

18. The UE of claim 16, when the type of the subframe in the primary cell is a downlink subframe, the predetermined downlink subframe on the PHICH is determined among a plurality of uplink subframes allocated in the primary cell based on the uplink/downlink configuration adopted in each of the primary cell and the secondary cell.

19. A base station (BS) for transmitting/receiving a signal in a wireless communication system supporting a hybrid automatic repeat request (HARQ) scheme, comprising:
   a transmitter configured to transmit control information on a physical downlink control channel (PDCCH) in a primary cell at a predetermined downlink subframe; and
   a receiver configured to receive data on a physical uplink shared channel (PUSCH) at a first uplink subframe allocated in a secondary cell based on the control information,
   wherein the predetermined downlink subframe on the PDCCH is determined based on a type of a subframe in the primary cell posited at a same timing position with the first uplink subframe and at least one of a uplink/downlink configuration adopted in each of the primary cell and the secondary cell, and the uplink/downlink configuration adopted in the primary cell is different from the uplink/downlink configuration adopted in the secondary cell.

20. The BS of claim 19, when the type of the subframe in the primary cell is a uplink subframe, the predetermined downlink subframe on the PDCCH is a downlink subframe allocated for scheduling of the uplink subframe in the primary cell.

21. The BS of claim 19, when the type of the subframe in the primary cell is a downlink subframe, the predetermined downlink subframe on the PDCCH is determined among a plurality of uplink subframes allocated in the primary cell based on the uplink/downlink configuration adopted in each of the primary cell and the secondary cell.

22. The BS of claim 19, wherein the transmitter transmits indication information on a physical HARQ indicator channel (PHICH) in the primary cell at a predetermined downlink subframe, and the receiver receives the data on the PUSCH at a second uplink subframe allocated in a secondary cell based on the transmitted indication information,
   wherein the predetermined downlink subframe on the PHICH is determined based on a type of a subframe in the primary cell posited at a same timing position with the second uplink subframe and at least one of a uplink/downlink configuration adopted in each of the primary cell and the secondary cell, and the uplink/downlink configuration adopted in the primary cell is different from the uplink/downlink configuration adopted in the secondary cell.

23. The BS of claim 22, when the type of the subframe in the primary cell is a uplink subframe, the predetermined downlink subframe on the PHICH is a downlink subframe allocated for scheduling of the uplink subframe in the primary cell.

24. The BS of claim 22, when the type of the subframe in the primary cell is a downlink subframe, the predetermined downlink subframe for the PHICH is determined among a plurality of uplink subframes allocated in the primary cell based on the uplink/downlink configuration adopted in each of the primary cell and the secondary cell.

* * * * *